(12) United States Patent
Hans et al.

(10) Patent No.: US 12,596,467 B2
(45) Date of Patent: Apr. 7, 2026

(54) ADVANCED APPLICATION OF MODEL OPERATIONS IN ENERGY

(71) Applicant: Schlumberger Technology Corporation, Sugar Land, TX (US)

(72) Inventors: Charu Hans, Houston, TX (US); Babu Sai Sampath Reddy Vinta, Houston, TX (US); Yongdong Zeng, Houston, TX (US); Lan Lu, Houston, TX (US); Jimin Zhang, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 71 days.

(21) Appl. No.: 18/553,146

(22) PCT Filed: Mar. 30, 2022

(86) PCT No.: PCT/US2022/022458
§ 371 (c)(1),
(2) Date: Sep. 28, 2023

(87) PCT Pub. No.: WO2022/212445
PCT Pub. Date: Oct. 6, 2022

(65) Prior Publication Data
US 2024/0176732 A1 May 30, 2024

Related U.S. Application Data

(60) Provisional application No. 63/168,201, filed on Mar. 30, 2021, provisional application No. 63/168,200,
(Continued)

(51) Int. Cl.
*G06F 9/44* (2018.01)
*G06F 3/04817* (2022.01)
(Continued)

(52) U.S. Cl.
CPC ........ *G06F 3/0484* (2013.01); *G06F 3/04817* (2013.01); *G06F 3/0482* (2013.01); *G06F 9/451* (2018.02); *G06F 16/29* (2019.01)

(58) Field of Classification Search
CPC ................................................... G06F 3/0484
(Continued)

(56) References Cited

U.S. PATENT DOCUMENTS

| | | | |
|---|---|---|---|
| 9,354,776 B1 | 5/2016 | Subramanian | |
| 10,817,530 B2 | 10/2020 | Siebel | |

(Continued)

FOREIGN PATENT DOCUMENTS

| | | |
|---|---|---|
| WO | 2020010251 A1 | 1/2020 |
| WO | 2020181027 A1 | 9/2020 |

OTHER PUBLICATIONS

Chen, A. et al., "Developments in MLflow: A System to Accelerate the Machine Learning Lifecycle", 2020 in Proceedings of the Fourth International Workshop on Data Management for End-to-End Machine Learning (pp. 1-4).
(Continued)

*Primary Examiner* — Evral E Bodden
(74) *Attorney, Agent, or Firm* — Jeffrey D. Frantz

(57) ABSTRACT

A method implements advanced application of model operations in energy. The method includes presenting an inspection view with a model list. The method further includes receiving a selection of a list entry, corresponding to a model, from the model list, wherein the model of the list entry is a champion model selected from multiple challenger models corresponding to the list entry. The method further receiving deployment settings of the model, presenting a deployment view with a deployment list with the model, and updating a deployment status of the model in the deployment view.

24 Claims, 8 Drawing Sheets

Related U.S. Application Data filed on Mar. 30, 2021, provisional application No. 63/168,198, filed on Mar. 30, 2021.

(51) Int. Cl.

| | |
|---|---|
| *G06F 3/0482* | (2013.01) |
| *G06F 3/0484* | (2022.01) |
| *G06F 9/451* | (2018.01) |
| *G06F 16/29* | (2019.01) |

(58) Field of Classification Search
USPC ........................................................ 717/124
See application file for complete search history.

(56) References Cited

U.S. PATENT DOCUMENTS

| | | | | |
|---|---|---|---|---|
| 11,409,756 | B1 | 8/2022 | Park | |
| 11,599,813 | B1 | 3/2023 | Yuan | |
| 2009/0106178 | A1 | 4/2009 | Chu | |
| 2009/0284530 | A1 | 11/2009 | Lester | |
| 2010/0185984 | A1 | 7/2010 | Wright | |
| 2014/0156806 | A1 | 6/2014 | Karpistsenko | |
| 2014/0310633 | A1 | 10/2014 | McLellan | |
| 2016/0210270 | A1 | 7/2016 | Kelly | |
| 2016/0274781 | A1 | 9/2016 | Wilson | |
| 2017/0091673 | A1* | 3/2017 | Gupta | G06N 5/022 |
| 2017/0178020 | A1* | 6/2017 | Duggan | G06F 16/22 |
| 2017/0193392 | A1* | 7/2017 | Liu | G06N 20/00 |
| 2017/0316114 | A1 | 11/2017 | Bourhani | |
| 2018/0307391 | A1 | 10/2018 | Bogomolov | |
| 2018/0349413 | A1 | 12/2018 | Shelby | |
| 2019/0066133 | A1 | 2/2019 | Cotton | |
| 2019/0147297 | A1 | 5/2019 | Rogers | |
| 2019/0147371 | A1* | 5/2019 | Deo | G06N 3/09 |
| | | | | 706/12 |
| 2019/0171428 | A1 | 6/2019 | Patton | |
| 2020/0019882 | A1 | 1/2020 | Garg | |
| 2020/0040719 | A1 | 2/2020 | Maniar | |
| 2020/0327969 | A1 | 10/2020 | Malvankar | |
| 2020/0380056 | A1 | 12/2020 | Morris et al. | |
| 2021/0264025 | A1* | 8/2021 | Givental | G06N 3/0464 |
| 2022/0270359 | A1* | 8/2022 | Pan | G06N 3/0442 |
| 2022/0300850 | A1 | 9/2022 | Mendez | |
| 2024/0176469 | A1 | 5/2024 | Zeng | |
| 2024/0184416 | A1 | 6/2024 | Zeng | |

OTHER PUBLICATIONS

"What is Amazon SageMaker ASageMaker AI", downloaded from the Internet on Dec. 25, 2024 from [https://docs.aws.amazon.com/sagemaker/latest/dg/whatis.html], 7 pages.

Dataiku Key Capabilities, downloaded from the Internet on Dec. 25, 2024 from [https://www.dataiku.com/product/key-capabilities/] 6 pages.

Hall, D.G. et al., "Users Guide Virtual Hydropower Prospector Version 1.1", Idaho National Laboratory, 2005, downloaded from the internet on Dec. 24, 2024 from [https://inldigitallibrary.inl.gov/sites/sti/sti/3488130.pdf], 38 pages.

Jing, C. et al., "Geospatial Dashboards for Monitoring Smart City Performance", Sustainability, 2019, 11(20), downloaded from the internet on Dec. 25, 2024 from [https://www.mdpi.com/2071-1050/11/20/5648/pdf], 23 pages.

Xu, H., "Development of a digitalization tool for linking thematic data to a background map", Lund University GEM thesis series nr 25, published 2017, downloaded from the internet on Dec. 25, 2024 from [https://lup.lub.lu.se/luur/download?func=downloadFile recordOId=8919462 fileOId=8919470], 54 pages.

Agrawal, A. et al., "Cloudy with High Chance of DBMS: A 10-year Prediction for Enterprise-Grade ML", arXiv:1909.00084v2, Dec. 27, 2019, 8 pages.

Ames, D. P. et al., "HydroDesktop: Web services based software for hydrologic data discovery, download, visualization, and analysis", Environmental Modelling Software 37, pp. 146-156, 2012.

Zhou, L. et al., "Transfer Fuction Design based on User Selected Samples for Intuitive Multivariate Volme Exploration", IEEE Pacific Visualization Simposium, 2013, 7 pages.

Yang, W. et al., "Diagnosing Concept Drift with Visual Analytics", arXiv:2007.14372v3, Sep. 15, 2020, 12 pages.

Cashman, D. et al., "A User-based Visual Analytics Workflow for Exploratory Model Analysis", arXiv:1809.10782v3, Jul. 29, 2019, 15 pages.

Albinhassan, N. M. et al, "Porosity prediction using the group method of data handling", Geophysics, 2011, 76(5), 8 pages.

Search Report and Written Opinion of International Patent Application No. PCT/US2022/022451 dated Jun. 2, 2022, 10 pages.

Search Report and Written Opinion of International Patent Application No. PCT/US2022/022443 dated May 12, 2022, 10 pages.

Search Report and Written Opinion of International Patent Application No. PCT/US2022/022458 dated May 24, 2022, 11 pages.

Extended Search Report issued in European Patent Application No. 22782063.6 dated Jan. 8, 2025, 7 pages.

Extended Search Report issued in European Patent Application No. 22782061.0 dated Feb. 13, 2025, 7 pages.

Extended Search Report issued in European Patent Application No. 22782064.4 dated Feb. 14, 2025, 6 pages.

* cited by examiner

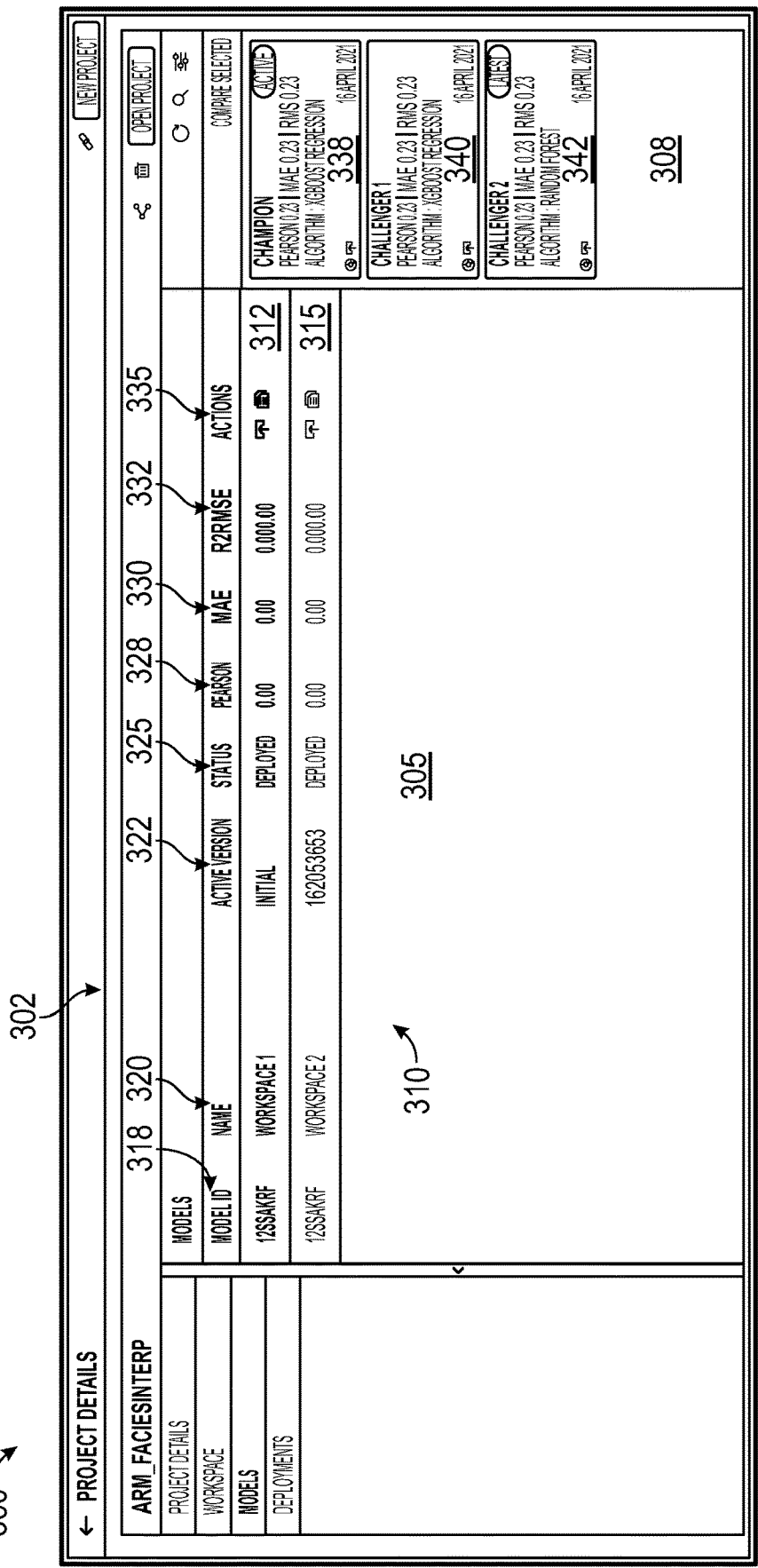
*FIG. 3.1*

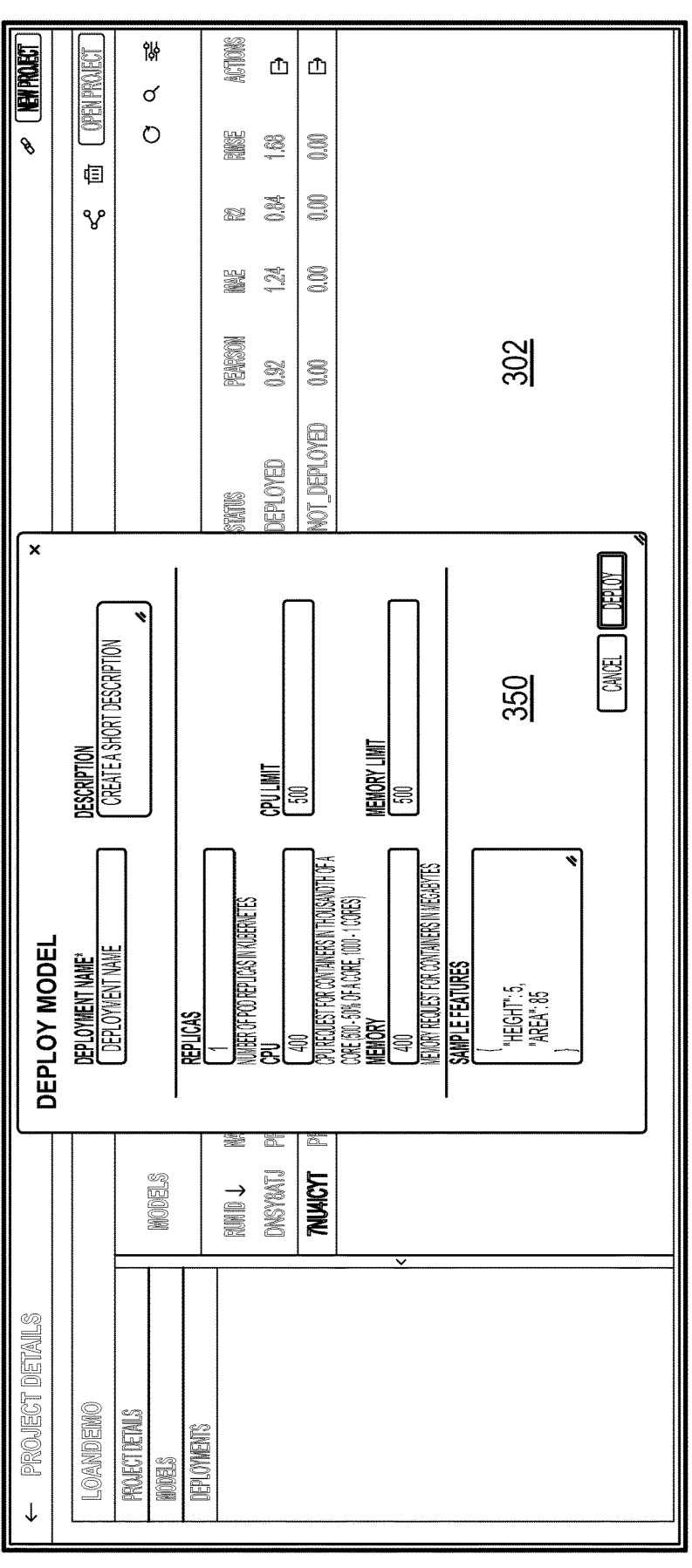
*FIG. 3.2*

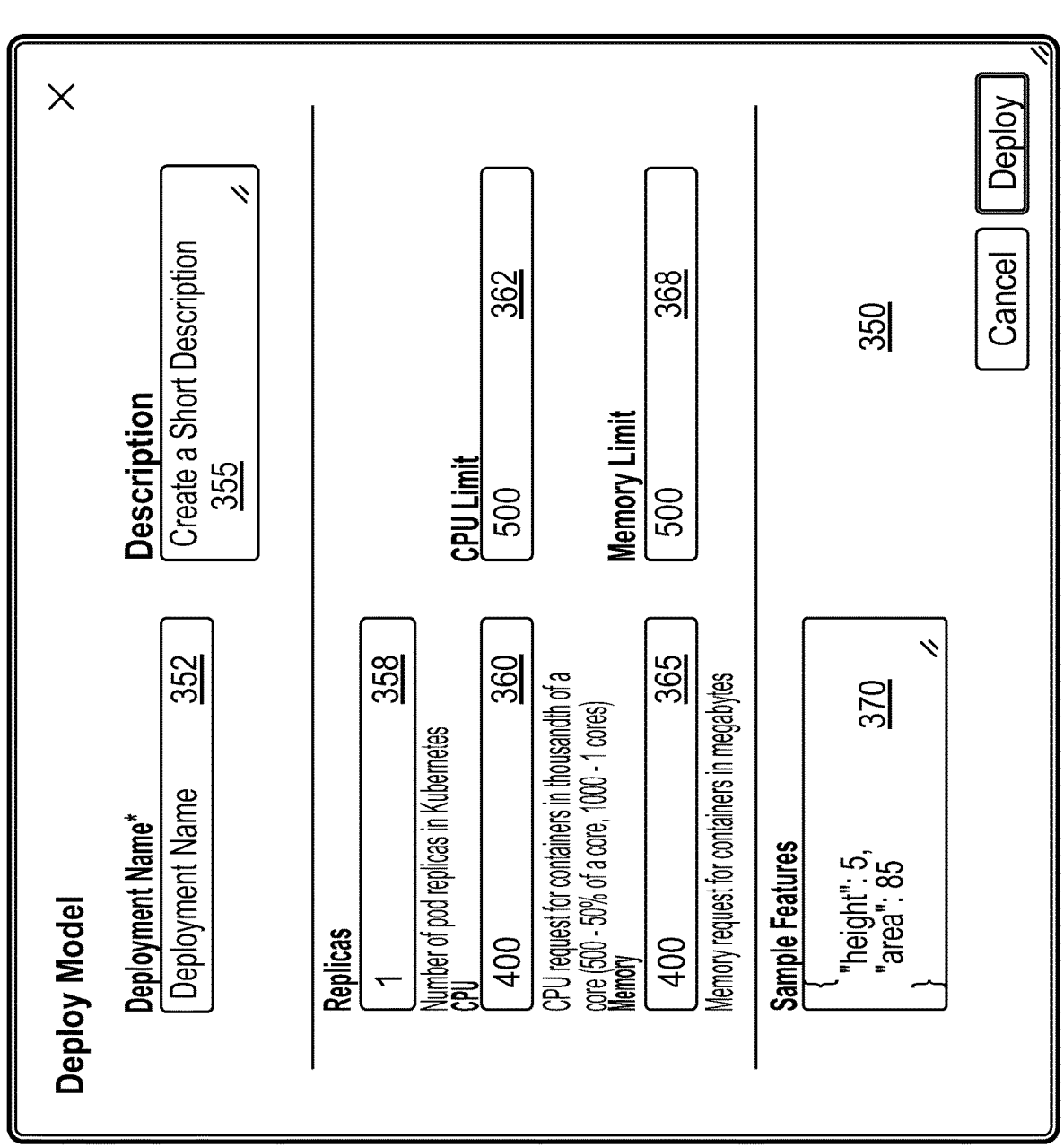
*FIG. 3.3*

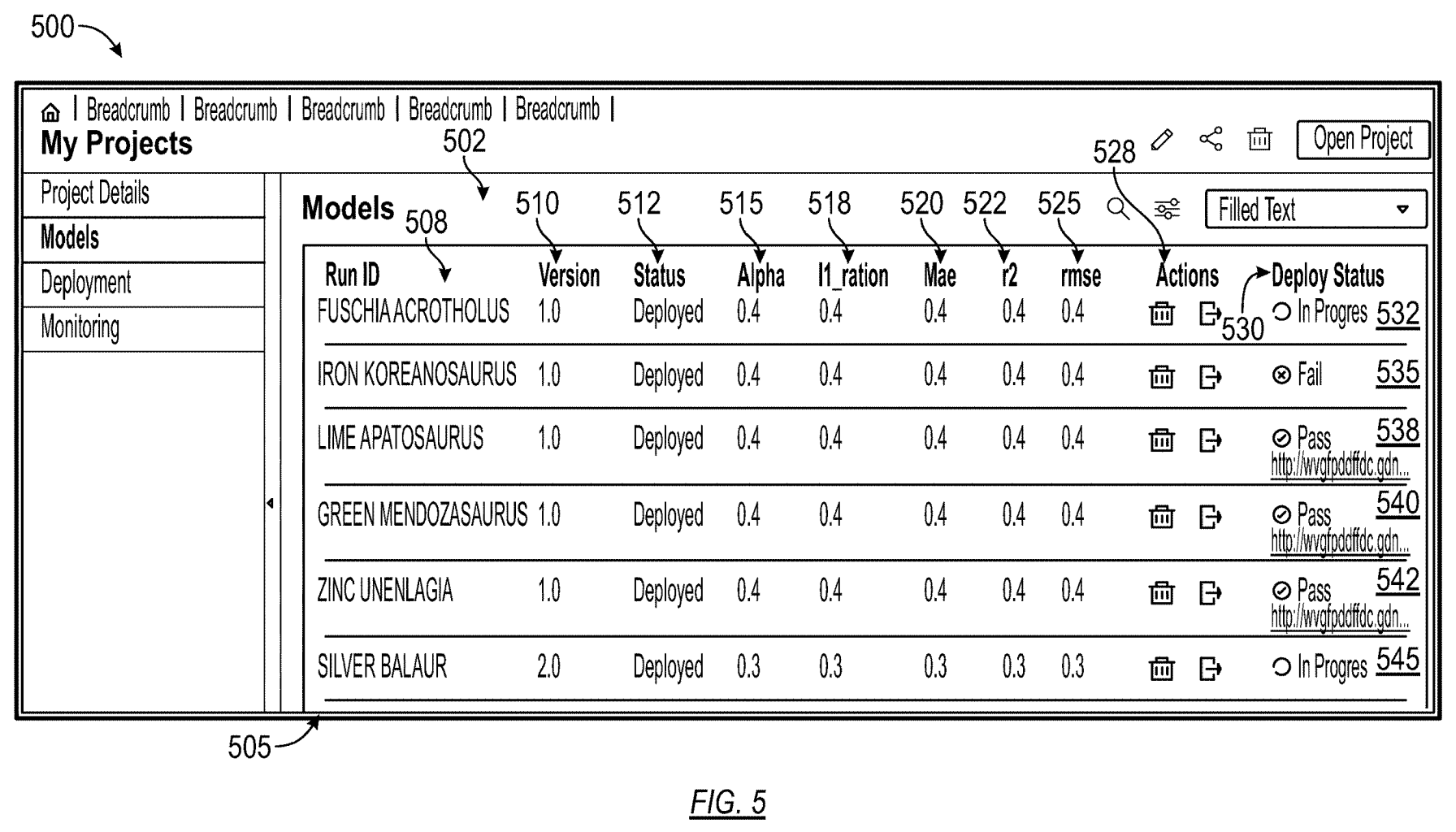

500

⌂ | Breadcrumb | Breadcrumb | Breadcrumb | Breadcrumb | Breadcrumb |

My Projects

502

Open Project ▸

| Project Details |
| Models |
| Deployment |
| Monitoring |

✎  ⅄  🗏  528  🔍  ⚙

Filled Text

Models 508

505

| Run ID | Version 510 | Status 512 | Alpha 515 | l1_ration 518 | Mae 520 | r2 522 | rmse 525 | Actions | Deploy Status |
|---|---|---|---|---|---|---|---|---|---|
| FUSCHIA ACROTHOLUS | 1.0 | Deployed | 0.4 | 0.4 | 0.4 | 0.4 | 0.4 | 🗏 ⤴ 530 | ○ In Progres 532 |
| IRON KOREANOSAURUS | 1.0 | Deployed | 0.4 | 0.4 | 0.4 | 0.4 | 0.4 | 🗏 ⤴ | ⊗ Fail 535 |
| LIME APATOSAURUS | 1.0 | Deployed | 0.4 | 0.4 | 0.4 | 0.4 | 0.4 | 🗏 ⤴ | ⊘ Pass 538 http://wvqtpddtfdc.cgn... |
| GREEN MENDOZASAURUS | 1.0 | Deployed | 0.4 | 0.4 | 0.4 | 0.4 | 0.4 | 🗏 ⤴ | ⊘ Pass 540 http://wvqtpddtfdc.cgn... |
| ZINC UNENLAGIA | 1.0 | Deployed | 0.4 | 0.4 | 0.4 | 0.4 | 0.4 | 🗏 ⤴ | ⊘ Pass 542 http://wvqtpddtfdc.cgn... |
| SILVER BALAUR | 2.0 | Deployed | 0.3 | 0.3 | 0.3 | 0.3 | 0.3 | 🗏 ⤴ | ○ In Progres 545 |

*FIG. 5*

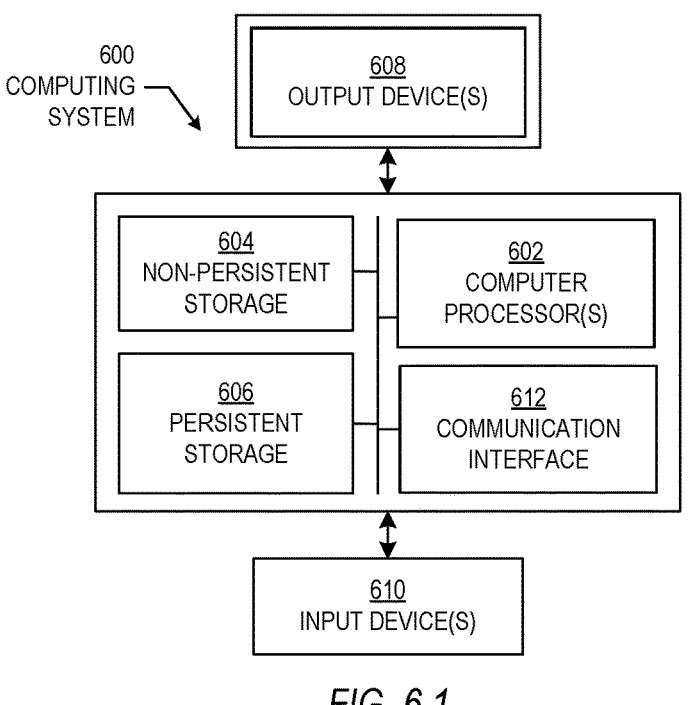
600
COMPUTING
SYSTEM
608
OUTPUT DEVICE(S)
604
NON-PERSISTENT
STORAGE
602
COMPUTER
PROCESSOR(S)
606
PERSISTENT
STORAGE
612
COMMUNICATION
INTERFACE
610
INPUT DEVICE(S)
*FIG. 6.1*
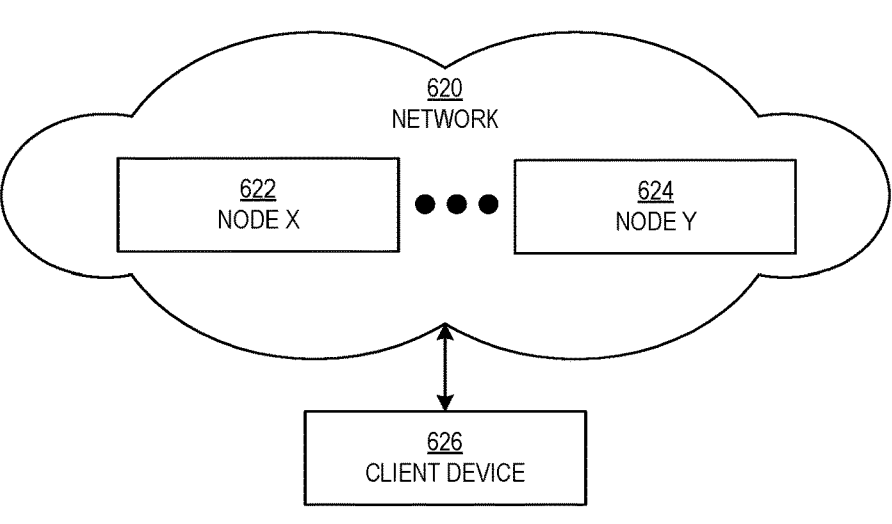
620
NETWORK
622
NODE X
624
NODE Y
626
CLIENT DEVICE
*FIG. 6.2*

ADVANCED APPLICATION OF MODEL OPERATIONS IN ENERGY

CROSS REFERENCE TO RELATED APPLICATIONS

This application is a National Stage entry of International Patent Application No. PCT/US2022/022458, filed on Mar. 30, 2022, which claims priority to U.S. Provisional Application No. 63/168,198, filed on Mar. 30, 2021, and U.S. Provisional Application No. 63/168,200, filed on Mar. 30, 2021, and [of] U.S. Provisional Application No. 63/168,201, filed on Mar. 30, 2021. This application is related to U.S. application Ser. No. 18/553,139, titled "ADVANCED DATA DISCOVERY AND VISUALIZATION FOR ENERGY DATA SOURCES", filed on Sep. 28, 2023, which is a National Stage Entry of International Patent Application No. PCT/US2022/022451, filed on Mar. 30, 2022, which claims the benefit of and priority to U.S. Provisional Application No. 63/168,198, filed on Mar. 30, 2021, of U.S. Provisional Application No. 63/168,200, filed on Mar. 30, 2021, and of U.S. Provisional Application No. 63/168,201, filed on Mar. 30, 2021. This application is also related to U.S. patent application Ser. No. 18/553,223, titled "INTEGRATED ENERGY DATA SCIENCE PLATFORM", filed on Sep. 29, 2023, which is a National Stage Entry of International Patent Application No. PCT/US2022/022443, filed on Mar. 30, 2022, which claims the benefit of and priority to U.S. Provisional Application No. 63/168,198, filed on Mar. 30, 2021, of U.S. Provisional Application No. 63/168,200, filed on Mar. 30, 2021, and of U.S. Provisional Application No. 63/168,201, filed on Mar. 30, 2021. Each of the applications above are incorporated herein by reference.

BACKGROUND

Digitalization of workflows using machine learning and artificial intelligence increases productivity in the energy industry. A challenge is to gain efficiency through the advanced application of technology to efficiently put machine learning models into production and deliver tangible results. Tools may be difficult to use or lack the simplicity and usability to enable the deployment, monitoring, and operation of machine learning models. A challenge is to develop and operationalize machine learning models using a combination of data in energy and other industries.

SUMMARY

In general, in one or more aspects, the disclosure relates to a method that implements advanced application of model operations in energy. The method includes presenting an inspection view with a model list. The method further includes receiving a selection of a list entry, corresponding to a model, from the model list, wherein the model of the list entry is a champion model selected from multiple challenger models corresponding to the list entry. The method further receiving deployment settings of the model, presenting a deployment view with a deployment list with the model, and updating a deployment status of the model in the deployment view.

Other aspects of the invention will be apparent from the following description and the appended claims.

BRIEF DESCRIPTION OF DRAWINGS

FIG. 3.1, FIG. 3.2, FIG. 3.3, FIG. 4, and FIG. 5 show examples in accordance with disclosed embodiments.

FIG. 6.1 and FIG. 6.2 show computing systems in accordance with disclosed embodiments.

DETAILED DESCRIPTION

Figure 1:
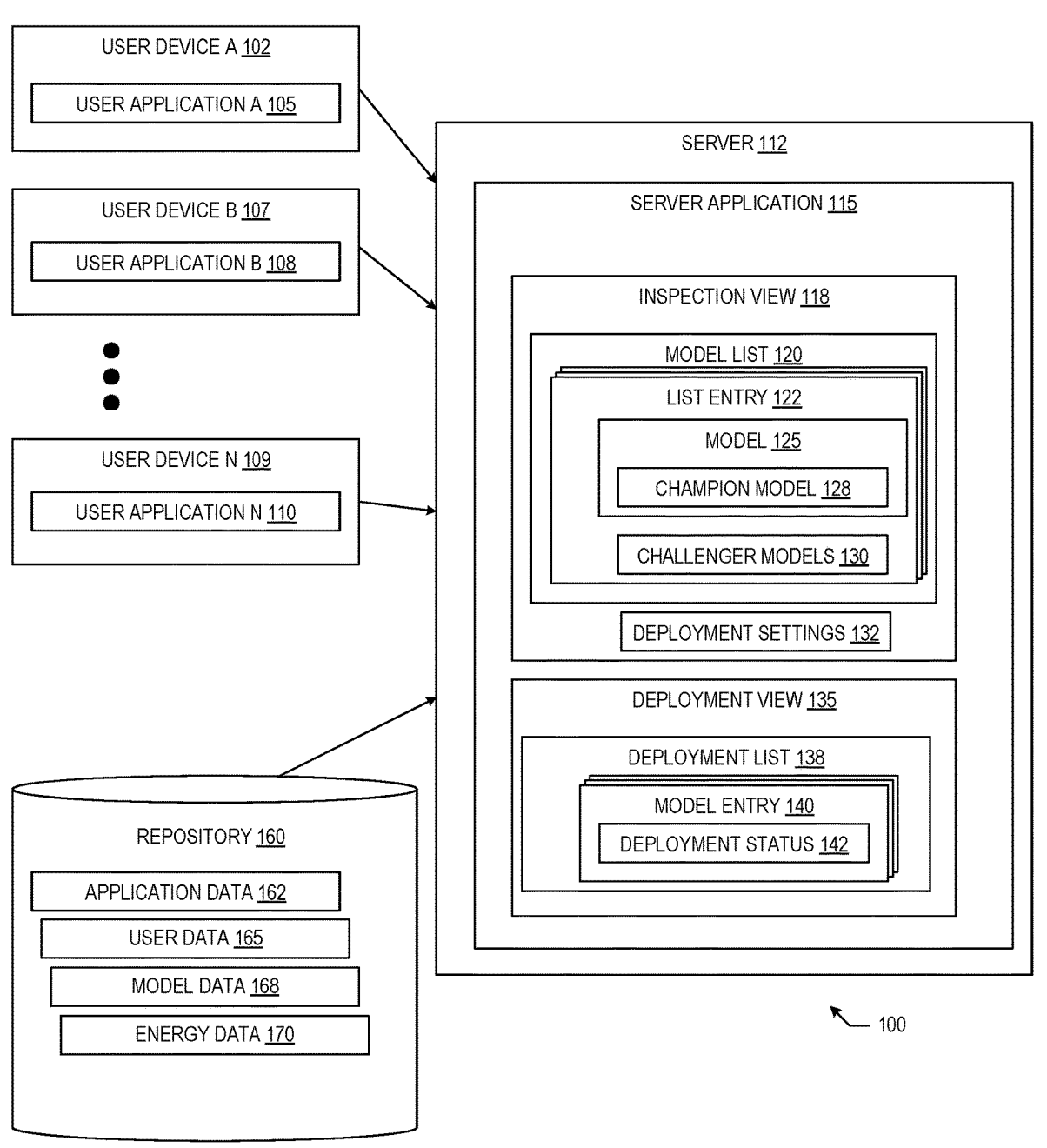
FIG. 1 shows a system in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments of the disclosure automate the operational aspect of machine learning workflows and apply techniques of machine learning operations. Embodiments of the disclosure allow the benefits of machine learning (ML) in tasks by automating the steps to package, scale, and continuously integrate, deploy and monitor models. Embodiments of the disclosure reduce the time to market for machine learning models and techniques for energy problems, which may use subsurface data.

Another challenge is the cloud providers may offer suites of machine learning platforms, with the capability to build, deploy and operate the models within the platforms, but the level of automation varies among these tools, and these tools may not integrate with data platforms. A challenge is to deliver artificial intelligence (AI) applications successfully through production.

Software platforms may facilitate machine learning pipelines by providing integrated tools to enable data preprocessing, model building, model training, and model deployment. Embodiments of the disclosure provide an AI platform with highly integrated pipeline focusing on energy data covering the entire lifecycle of the machine learning, including data discovery, model architecture, model training, deployment and operation.

The figures show diagrams of embodiments that are in accordance with the disclosure. The embodiments of the figures may be combined and may include or be included within the features and embodiments described in the other figures of the application. The features and elements of the figures are, individually and as a combination, improvements to the technology of data exploration and machine learning model development and systems. The various elements, systems, components, and steps shown in the figures may be omitted, repeated, combined, and/or altered as shown from the figures. Accordingly, the scope of the present disclosure should not be considered limited to the specific arrangements shown in the figures.

Turning to FIG. 1, the system (100) implements advanced application of model operations in energy. Users operate the user devices A (102), B (107), and N (109) to access applications, websites, services, etc., that may be hosted by the server (112). The server (112) hosts a platform that allows users, who are not data scientists, to develop machine learning models for data analysis projects. In one embodiment, the data analysis projects include machine learning models that analyze the data located for the user. The system (100) includes the user devices A (102), B (107), and N (109), the server (112), and the repository (160).

The server (112) is a computing system (further described in FIG. 6.1). The server (112) may include multiple physical and virtual computing systems that form part of a cloud computing environment. In one embodiment, execution of the programs and applications of the server (112) is distributed to multiple physical and virtual computing systems in the cloud computing environment. The server (112) includes the server application (115).

The server application (115) is a collection of programs that may execute on multiple servers of a cloud environment, including the server (112). The server application (115) presents the inspection view (118) and the deployment view (135). The inspection view (118) displays models and deployment settings. The deployment view (135) displays the deployment status of models. In one embodiment, the server application (115) may host applications accessed by users of the user devices A (102) through N (109). The applications hosted by the server application (115) may serve structured documents (hypertext markup language (HTML) pages, extensible markup language (XML) pages, JavaScript object notation (JSON) files and messages, etc.).

The inspection view (118) is a view presented to a user of a user device (e.g., the user device A (102)) in a user interface. The inspection view (118) includes the model list (120) and the deployment settings (132).

The model list (120) presents a list of entries (including the list entry (122)) of data analysis projects. A data analysis project is a project that analyzes data, which may include a workspace. In one embodiment, a workspace is a grouping of source code files that make up a larger unit (e.g., a web page, a website, a software program, etc.) may include multiple files and directories. One data analysis project may correspond to one list entry. In other words, a one-to-one mapping may exist between list entries and data analysis projects.

The list entry (122) is an entry for a data analysis project. The list entry (122) includes the model (125) and the challenger models (130). In one embodiment, the list entry (122) may include model accuracy metrics that identify the accuracy of the model (125). In one embodiment, the model accuracy metrics may include mean absolute value (MAV), mean absolute error (MAE), root mean squared error (RMS), Pearson correlation coefficient (PCC), etc.

The model (125) is a machine learning model that is selected for the data analysis project that corresponds to the list entry (122). The model (125) is identified as the champion model (128) from the challenger models (130).

The champion model (128) is selected from the challenger models (130). The champion model (128) is selected as the model to be deployed for the data analysis project represented by the list entry (122). The champion model (128) may be selected using model accuracy metrics describing the accuracy of the challenger models (130).

The challenger models (130) are a set of machine learning models from which the champion model (128) may be selected. The different challenger models (130) may use different machine learning model algorithms. The machine learning models may include regression models, random forest models, neural network models, etc. In one embodiment, the challenger models (130) are presented with model analysis metrics that may be used to identify the champion model (128) automatically by the system (100).

The deployment settings (132) are settings for the deployment of the model (125). In one embodiment, the deployment settings (132) are presented to a user device and displayed in a user interface. In one embodiment, the deployment settings (132) identify central processing unit (CPU) and memory parameters (e.g., minimums and maximums) for deploying the model (125).

The deployment view (135) presents deployment information. The deployment view (135) may be presented to and displayed on a user device (e.g., the user device A (102)). The deployment view (135) includes the deployment list (138).

The deployment list (138) is a list of model entries including the model entry (140). In one embodiment, the deployment list (138) includes a model list for each machine learning model deployed with the system (100).

The model entry (140) is an entry of the deployment list (138). The model entry (140) displays information about a model. In one embodiment, the model entry (140) corresponds to the model (125) and displays the deployment status (142) of the model (125).

The deployment status (142) is a set of information for the model entry (140). In one embodiment, the deployment status (142) may include an image, text, and a link. The image may represent the deployment status that is also identified with the text. The text of the deployment status may include strings stating "in progress", "fail", "pass", etc. The link may be provided after the model has been successfully deployed and include a uniform resource locator (URL).

The user devices A (102) and B (107) through N (109) are computing systems (further described in FIG. 6.1). For example, the user devices A (102) and B (107) through N (109) may be desktop computers, mobile devices, laptop computers, tablet computers, server computers, etc. The user devices A (102) and B (107) through N (109) include hardware components and software components that operate as part of the system (100). The user devices A (102) and B (107) through N (109) communicate with the server (112) to access and manipulate information, including the application data (162). The user devices A (102) and B (107) through N (109) may communicate with the server (112) using standard protocols and file types, which may include hypertext transfer protocol (HTTP), HTTP secure (HTTPS), transmission control protocol (TCP), internet protocol (IP), hypertext markup language (HTML), extensible markup language (XML), etc. The user devices A (102) and B (107) through N (109) respectively include the user applications A (105) and B (108) through N (110).

The user applications A (105) and B (108) through N (110) may each include multiple programs respectively running on the user devices A (102) and B (107) through N (109). The user applications A (105) and B (108) through N (110) may be native applications, web applications, embedded applications, etc. In one embodiment the user applications A (105) and B (108) through N (110) include web browser programs that display web pages from the server (112). In one embodiment, the user applications A (105) and B (108) through N (110) provide graphical user interfaces that display energy data analysis software and services hosted by the system (100).

As an example, the user application A (105) may be used by a user to develop and select machine learning models that analyze the energy data (170). After identifying the energy information, the user may select the champion model (128) from the challenger models (130) for deployment with the system (100).

The repository (160) is a computing system that may include multiple computing devices in accordance with the computing system (600) and the nodes (622) and (624) described below in FIGS. 6.1 and 6.2. The repository (160) may be hosted by a cloud services provider that also hosts the server (112). The cloud services provider may provide hosting, virtualization, and data storage services as well as other cloud services and to operate and control the data, programs, and applications that store and retrieve data from the repository (160). The data in the repository (160) may be hosted by different databases and include the application data (162), the user data (165), the model data (168), and the energy data (170).

The application data (162) includes information hosted by the server (112) and presented to the user devices A (102) and B (107) through N (109). For example, the application data (162) may include HTML files that form the inspection view (118) and the deployment view (135).

The user data (165) includes information that describes the users of the system (100). The user data (165) may include user profile information, which may include values for the username of a user and settings for an application accessed by the user through the system (100). The user data (165) may be used to identify the data, applications, and services that a user is authorized to access.

The model data (168) includes data and information about the machine learning models for the data analysis projects generated by the users of the system (100). The model data (168) includes the artifacts of the models (parameters, weights, metadata, etc.) generated from training the machine learning models with the data selected by the users. The model data (168) may also include model analysis metrics that identify the accuracy of the models.

The energy data (170) is data that relates to energy. In one embodiment, the energy data (170) includes exploration data, production data, subsurface data, etc. The energy data (170) may include data from wells, windfarms, etc.

Although shown using distributed computing architectures and systems, other architectures and systems may be used. In one embodiment, the programs described above may be part of a monolithic application executing on the server (112), or the user devices A (102) and B (107) through N (109).

Figure 2:
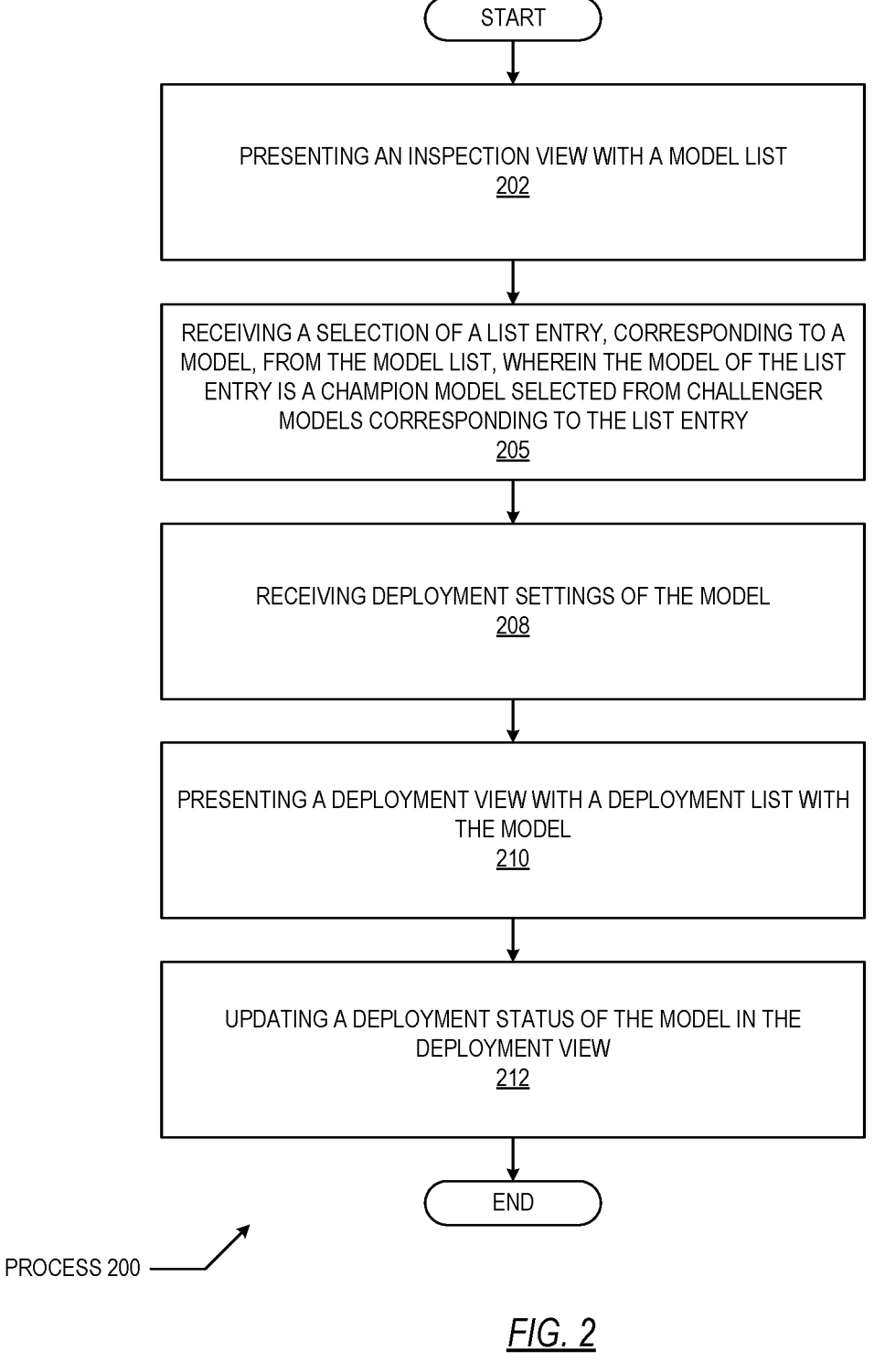
FIG. 2 shows a flowchart in accordance with disclosed embodiments.

Turning to FIG. 2, the process (200) implements advanced application of model operations in energy. The process (200) may be performed by a server computing system, which make communicate with a user device.

At Block 202, an inspection view is presented with a model list. The inspection view may be presented by transmitting information to be displayed in the inspection view to a user device that displays the inspection view with the information.

In one embodiment, model lineages of the models of the system are stored. Model lineages identify versions of the models, training times of the models, training data the models were trained with, metadata of the models, algorithms of the models, parameters of the models, validation accuracies of the models, etc. The model lineages may be presented to the user to display the histories of the development of the models of the system.

At Block 205, a selection of a list entry, corresponding to a model, is received from the model list. The model of the list entry is a champion model selected from challenger models corresponding to the list entry. The challenger models may be displayed in a model window that is updated in response to selection of the model list displayed in a project window. Each list entry of the model list may correspond to a data analysis project. The challenger models may be different types of models, including regression models, random forest models, neural network models, etc. In one embodiment, the champion model may have a model accuracy metric that is greater than model accuracy metrics for the remaining challenger models.

In one embodiment, the selection may be received from a user device. The selection may be in response to displaying the model list.

In one embodiment, the champion model is designated over the challenger models based on a metric. The metric may be one of a number of model accuracy metrics that identify the accuracy of the model. The champion model may be automatically selected from the list of challenger models periodically after retraining of the challenger models is performed. The periodicity of the champion model selection and challenger model retraining may be monthly, weekly, daily, etc.

In one embodiment, the list entry is presented with a validation accuracy of the model. The validation accuracy may be a selected metric of a number of model accuracy metrics. The model accuracy metrics identify the accuracy of the predictions of the models. The model accuracy metrics may include mean absolute value (MAV), mean absolute error (MAE), root mean squared error (RMS), Pearson correlation coefficient (PCC), etc.

In one embodiment, the challenger models are presented with corresponding validation accuracies. The validation accuracies include model accuracy metrics that may be displayed to a user of the system.

At Block 208, deployment settings of the model are received. The deployment settings may identify minimum and maximum values for the number of central processing units and amounts of memory to be used by the model when the model is deployed. The deployment settings may be received from a user device after the user selects the model from the model list.

In one embodiment, the model is deployed using the deployment settings and a procedure call standard of a plurality of procedure call standards. Procedure called standards may include standards for representational state transfer (REST), remote procedure calls (gRPC), etc. In one embodiment, deployment of a model includes identifying executable code of a trained version of the model, provisioning hardware (and software) resources (e.g., servers with processors, memories, application programming interfaces, etc.) in accordance with the deployment settings for the model, copying the executable code to the hardware resources, generating a link do identify the location of the model (and hardware resources), and transmitting messages notifying the system that the model has been deployed to the set of hardware resources.

In one embodiment, the model is deployed using continuous deployment and continuous delivery. An automated pipeline may be used to train, test, deploy, and continuously improve the model in production.

At Block 210, a deployment view is presented with a deployment list with the model. The deployment view may be displayed on a user interface of a user device after being transmitted to the user device. The deployment status may include text that describing a state of deployment of the model as one of "pass", "fail", "in progress", etc.

In one embodiment, a deployment status of the model may be presented with a link to the model. The deployment status may be displayed on a user interface in a deployment view showing a list of models (corresponding to data analysis projects). The link may be a uniform resource locator (URL) for the model that receives data and transmits results using a standard protocol (REST, gRPC, etc.).

At Block 212, a deployment status of the model is updated in the deployment view. The deployment view may be updated on a user interface displayed on a user device after the updates to the deployment status or transmitted to the user device. In one embodiment, the deployment status may be "in progress" while the CPU's and memory for the model are provisioned. After being provisioned, the deployment status may be "pass" after the provisioning had succeeded and the model has been copied to a host machine. Otherwise, the display status may be "fail" to indicate there was an issue that could not be resolved.

In one embodiment, deployment of the model is monitored with performance metrics, audit logs, and relevant performance indicators. The performance metrics identify the performance of the model and may include model accuracy metrics. The audit logs may be logs generated by the machine hosting model. The relevant performance indicators may be specific outputs of the model identified by a user.

In one embodiment, degradation of the model over time may be identified using model drift alert. The model drift alert may be based on a model accuracy metric, which may change over time. When the model accuracy metric reduces, the model may have degraded and the schedule for retraining.

In one embodiment, deployment of the model is monitored to auto-scale compute resources allocated to the model. Auto-scaling provides visibility and cost management to the end user of the model. For example, the system may determine that a model is using less than a minimum threshold of resources and reprovision the host machine to have fewer resources. Further, the system may determine that the model is using more than a maximum threshold of resources and reprovision the host machine to have additional resources.

FIGS. 3.1, 3.2, and 3.3 show examples of a user interfaces with inspection views. Embodiments of the disclosure provide scalable, collaborative and production ready platform with the rich set of tools and an intuitive user interface (UI) to make the machine learning operations seamless and efficient for an enterprise. Data scientist users may train, test, and track multiple machine learning models and may create custom models through an embedded notebook interface (e.g., python notebooks). Models are versioned with lineage and a history of the model is kept that includes: the time the model was trained, the data the model was trained with, metadata, algorithms, parameters, validation accuracy, etc., which are stored in a repository. The above information may be visible to users through an intuitive user interface. FIG. 3.1, shows an example user interface that displays multiple models and versions inside of a collaborative project.

The trained models can then be deployed as representational state transfer (REST) or "gRPC remote procedure calls" (gRPC) based services. The deployed model may be integrated with role-based access controls and legal governance. The steps of packaging, scaling and deploying the model on elastics compute is fully automated. Furthermore, the runtime clusters may be customized for different computation requests with the options of graphics processing unit (GPU), tensor processing unit (TPU), serverless, and accelerated parallel computation (CUDA). Data scientist users may test the API (application programming interface) of a deployed model with the user interface (UI). An example of simple model deployment through a UI is shown in FIGS. 3.2 and 3.3, in which use of the UI reduces the time to market for AI (artificial intelligence) projects.

Figure 4:
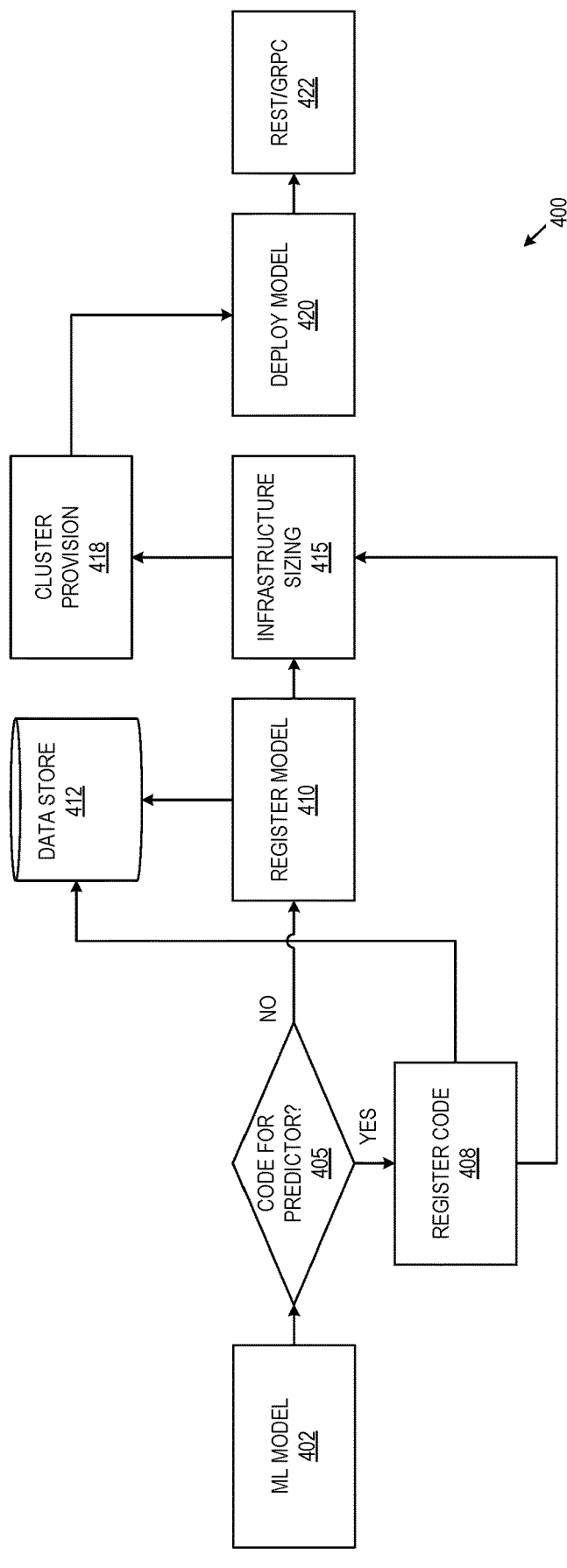

FIG. 4 shows the model deployment flow that works with the UI. While data scientist users deploy the models, the related metadata and model files may be stored in various elastic storages. Models may be deployed in either a cloud based or on an on-premises cluster.

In one embodiment, the deployment process embraces continuous integration and continuous delivery (CI/CD) (e.g., evergreen models) by setting up automated pipelines to train, test, and deploy models in production. Continuous integration and continuous delivery continuously improves the models with the latest energy data. Data scientist users may also compare the accuracy of various models by replaying the predictions of a model on historical production data.

In one embodiment, the system provides enterprise level performance monitoring of deployed models, an example of which is shown in FIG. 5. The performance metrics that are tracked include audit logs and relevant performance indicators. Model drift alerts may be set up to capture the model degradation over time. In addition to capturing performance metrics, the performance monitoring is further instrumented to enable auto-scaling of the compute resource for visibility and cost management.

Turning to FIG. 3.1, the user interface (300) display the inspection view (302). The inspection view (302) includes the project window (305) and the model window (308).

The project window (305) includes the model list (310) displayed in a table. The table includes the rows (312) and (315) and includes the columns (318), (320), (322), (325), (328), (330), (332), and (335).

The columns (318), (320), (322), (325), (328), (330), (332), and (335) identify information for the data analysis projects displayed in the model list (310).

The column (318) displays model identifiers of the models of the data analysis projects displayed in the model list (310). The model identifiers disambiguate between different data analysis projects. In one embodiment, the model identifiers of the models may be strings with alphanumeric characters.

The column (320) displays names of the models. The names of the projects may be selected by the user and include a name for the workspace of the projects.

The column (322) displays version identifiers of the models of the projects displayed in the model list (310). The version identifiers disambiguate between different versions of a model corresponding to a row of the model list (310).

The column (325) displays deployment statuses of the models. The deployment status of a model may be displayed with a text string, e.g., "Deployed", "Not Deployed", etc.

The columns (328), (330), and (332) display model accuracy metrics. The model accuracy metrics include Pearson coefficients in the column (328), mean absolute error (MAE)

in the column (330), and r squared root mean squared error (R2RMSE) in the column (332).

The column (335) displays actions that may be taken for the models. Each action may be displayed with an icon that, when selected, performs the action. Actions that may be performed include deploying a model and entering deployment settings for a model.

The rows (312) and (315) correspond to different data analysis projects. One row of the model list may correspond to a model, a data analysis project, and a workspace. Selection of the row (312) triggers an update to the model window (308) to display the champion and challenger models associated with the row (312).

The model window (308) displays the cards (338), (340), and (342) for the champion and challenger models for the row (312). Each of the cards (338), (340), and (342) display model accuracy, a text description of the algorithm of the model, and a date identifying when the corresponding model was most recently updated.

The card (338) indicates that the model corresponding to the card (330) is the active model. The active model is the model that will be used by the external developers as opposed to the model represented by the cards (340) and (342).

The card (342) indicates that the model corresponding to the card (342) is the latest model. The latest model is the model that has been most recently updated. The latest model may not be the active model, for example, when the performance of the latest model is not as high as the other models.

Turning to FIG. 3.2, the deployment settings window (350) is displayed. The deployment settings window (350) is displayed in response to selection of an action from the column (335) of the row (312) (of FIG. 3.1). The deployment settings window (350) is displayed on top of the inspection view (302).

Turning to FIG. 3.3, the deployment settings window (350) displays the user interface elements (352) through (370). The user interface elements (352) through (370) are used to collect deployment settings.

The user interface elements (352) collects a deployment name. The deployment name is a text string input by the user to the user interface elements (352).

The user interface element (355) collects a short description for a deployment. The short description is a textual description for the deployment that is stored as a text string with the deployment settings.

The user interface element (358) collects the number of replicas to be used for deployment. The number of replicas identifies the number of times a process of a model may be replicated on a virtual machine.

The user interface element (360) collects the CPU request amount and the user interface element (362) collects the limit to the CPU request. The limit identifies the upper bound for the number of CPUs for deploying a machine learning model. In one embodiment, the units of the request are in thousandths of a core (e.g., a request of "500" is for 0.5 cores).

The user interface element (365) collects the memory request amount and the user interface element (368) collects the limit to the memory request. The limit identifies an upper bound for the amount of memory for deploying a machine learning model. In one embodiment, the units of the request are in megabytes (e.g., a request of "64" is for 64 megabytes).

The user interface element (370) collects structured text that identifies the sample features used by the machine learning model. These sample features are the features that are input to the machine learning model. The sample features for the machine learning model corresponding to the deployment settings window (350) includes the "height" and the "area". Different models may use different sample features.

Turning to FIG. 4, the flow (400) includes several blocks that may be performed by systems implementing the disclosure. The flow (400) may be implemented with a server computer.

At Block 402, a machine learning model is selected. The machine learning model is part of a data analysis project with a workspace. The workspace includes data identified by the user. The data may be energy data that is analyzed using the machine learning model. The machine learning model may provide predictions based on the input energy data and be referred to as a predictor.

At Block 405, a determination is made as to whether the machine learning model includes code. The machine learning model may be implemented using source code files. Previously developed machine learning models may be implemented with executable files that may not include the original source code for the model.

At Block 408, if the machine learning model includes code, then the code is registered to the data store (412). The code registered to the data store may be updated periodically or on demand when changes are made to the code. The code may be written in a programming language, including Python, C, C++, Java, etc.

At Block 410, when the machine learning model does not include code, then the model made be registered to the data store (412) by identifying a version of the model. The version of the model may be updated periodically or on demand when changes are made to the model.

The data store (412) is a repository of information. The data store (412) may be implemented as a computing system that may include multiple computing devices in accordance with the computing system (600) and the nodes (622) and (624) described below in FIGS. 6.1 and 6.2.

At Block 415, after the machine learning model (and corresponding code) is registered, infrastructure sized to deploy the machine learning model. Sizing the infrastructure includes selecting the amount of processing power and memory to devote to a process that implements the machine learning model. Sizing the infrastructure may also include identifying the number of virtual machines to execute the processes that implement the machine learning model.

At Block 418, clusters are provisioned. A cluster is a collection of virtual machines that execute the process is implementing the machine learning models. The clusters are provisioned by logging into the virtual machines and transferring the executable files or source code files to the virtual machine.

At Block 420, the model is deployed. The model is deployed bye generating a uniform resource locator for the model that is accessible to external processes.

At Block 422, the model is accessed by external processes using a communication standard. Communication standards that may be used include representational state transfer (REST) and remote procedure call (e.g., gRPC). The model may be called by an external process to receive data, process the data, and then return results to the external process.

Turning to FIG. 5, the user interface (500) displays the deployment view (502). The deployment view includes the deployment list (505) displayed in a table. The table includes the columns (508), (510), (512), (515), (518), (520), (522), (525), (528), and (530) and includes the rows (532), (535), (538), (540), (542), and (545).

The column (508) displays run identifiers of the models represented in the deployment list (505). The run identifiers disambiguate between different instances of the model that may be running on different systems for different users.

The column (510) displays version identifiers of the models represented in the deployment list (505). The version identifiers disambiguate between different versions of a model corresponding to a row of the deployment list (505).

The column (512) displays deployment statuses of the models. The deployment status of a model may be displayed with a text string, e.g., "Deployed", "Not Deployed", etc.

The columns (515) through (525) display model accuracy metrics. The model accuracy metrics include alpha in the column (515), 11 rotation in the column (518), mean absolute error (MAE) in the column (520), r squared in the column (522), and root mean squared error (RMSE) in the column (525).

The column (528) displays actions that may be taken for the models. Each action may be displayed with an icon that, when selected, performs the action. Actions that may be performed include deleting a model from the list (505) and deploying a model.

The column (530) deployment status is of the individual instances of the models listed in the deployment list (505). The deployment status in the column (530) may include a text description, an icon, and a link. The text descriptions ("In Progress", "Fail", "Pass", etc.) textually identify the status of deploying and instance of a model. The icons visually identify the status of deploying and instance of a model. The link provides a uniform resource locator (URL) that may be used to access the model to transmit data to the model and receive results from the model.

The rows (532) through (545) correspond to different deployment instances of a model. The same model may be executed with different run identifiers corresponding to different rows. For example, the rows (532) and (535) may correspond to the same model but use different run identifiers to disambiguate between the different instances.

Operating a machine learning model may have challenges, which include model packaging, infrastructure and configuration, deployment automation model lifecycle management tooling, etc. Embodiments of the disclosure address these issues with the following features.

An intuitive and collaborative interface to visualize models built for energy markets within the projects. The models may be categorized by deployment status of the models.

An elastic storage for a model comprising the energy data used for training, validation, and testing of the model, including the meta data of the model.

An easy-to-navigate, low-code user interface is used to perform the deployment of a machine learning model to the execution environment. A mechanism is also included to quickly validate a deployed model using the model end points displayed on the same user interface.

A high-performance cloud compute environment is provided for model execution and prediction with the options of graphics processing unit (GPU), serverless, and parallel compute platforms (e.g., compute unified device architecture (CUDA)) and application programming interfaces (APIs) are supported. Furthermore, the runtime clusters may be customized for different computation requests. A consolidated user interface displays performance metrics and lineages of deployed models.

End points for each deployed model may be displayed to integrate with other application for real-time model prediction on newly acquired energy data. A consolidated view of model deployments displaying model drift, resource usage and other relevant performance indicators.

Embodiments of the disclosure enable rapid creation and deployment of machine learning models for energy markets and data and reduces the friction of machine learning life cycle management from model inception to workflow realization. Embodiments of the disclosure provide an end-to-end machine learning operations solution with automated monitoring services inspecting the health of the models along with data drift, usage predictions, and visibility into resource utilization.

Embodiments of the disclosure reduce the knowledge of developer operations and machine learning pipelines for machine learning (ML) operations. Embodiments of the disclosure provide a single tool that has end to end spectrum coverage to generate and deploy machine learning operations.

Embodiments of the disclosure provide a low code approach that reduces the amount of knowledge and expertise for deploying and managing machine learning models. Embodiments of the disclosure allow domain experts to monitor and manage machine learning models without special operation support.

Embodiments of the disclosure enable low code composability to democratize usage beyond developers and data scientists to users who are familiar with the energy domain. Embodiments of the disclosure provide the ability to keep track of the model lineage and provide functionalities to monitoring the model performance.

Embodiments of the disclosure provide integration with energy and production (E&P) data and the ability to train and re-train the models. Embodiments of the disclosure enable efficiency gains by providing an end-to-end integrated machine learning design and deployment in a single platform through an integration of AI tools. Embodiments of the disclosure democratize data science by providing and intuitive low code environment for model deployment and operation.

Embodiments disclosed herein may be implemented on a computing system. Any combination of mobile, desktop, server, router, switch, embedded device, or other types of hardware may be used. For example, as shown in FIG. 6.1, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the technology.

The computing system (600) in FIG. 6.1 may be connected to or be a part of a network. For example, as shown in FIG. 6.2, the network (620) may include multiple nodes (e.g., node X (622), node Y (624)). Each node may correspond to a computing system, such as the computing system shown in FIG. 6.1, or a group of nodes combined may correspond to the computing system shown in FIG. 6.1. By way of an example, embodiments of the technology may be implemented on a node of a distributed system that is connected to other nodes. By way of another example, embodiments of the technology may be implemented on a distributed computing system having multiple nodes, where each portion of the technology may be located on a different node within the distributed computing system. Further, one or more elements of the aforementioned computing system (600) may be located at a remote location and connected to the other elements over a network.

Although not shown in FIG. 6.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6.1. Further, the client device (626) may include and/or perform all or a portion of one or more embodiments of the technology.

The computing system or group of computing systems described in FIGS. 6.1 and 6.2 may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process; or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the technology. The processes may be part of the same or different applications and may execute on the same or different computing systems.

Rather than or in addition to sharing data between processes, the computing system performing one or more embodiments of the technology may include functionality to receive data from a user. For example, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the technology, may extract one or more data items from the obtained data. For example, the extraction may be performed as follows by the computing system in FIG. 6.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail, such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 6.1, while performing one or more embodiments of the technology, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A–B), and the status flags may be read to determine if the result is positive (i.e., if A>B, then A–B>0). In one or more embodiments, B may be considered a threshold, and A is deemed to satisfy the threshold if A=B or if A>B, as determined using the ALU. In one or more embodiments of the technology, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 6.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents a few examples of functions performed by the computing system of FIG. 6.1 and the nodes and/or client device in FIG. 6.2. Other functions may be performed using one or more embodiments of the technology.

While the technology has been described with respect to a limited number of embodiments, those skilled in the art, having benefit of this disclosure, will appreciate that other embodiments may be devised which do not depart from the scope as disclosed herein. Accordingly, the scope of the technology should be limited only by the attached claims.

What is claimed is:

1. A method, comprising:
presenting an inspection view with a model list, the model list comprising a plurality of list entries, each list entry corresponding to a respective data analysis project, each list entry comprising:
   a plurality of challenger models corresponding to the respective data analysis project for the list entry; and
   a selected model comprising a champion model for the respective data analysis project, the champion model being automatically selected from among the plurality of challenger models periodically after retraining of the plurality of challenger models is performed;
receiving a selection of a selected list entry from among the plurality of list entries in the model list;
receiving deployment settings of the selected model of the selected list entry;
presenting a deployment view with a deployment list with the selected model; and
updating a deployment status of the selected model in the deployment view,
wherein the retraining of the plurality of challenger models is performed periodically after a deployment of the selected model based on at least a performance metric monitored during the deployment.

2. The method of claim 1, further comprising:
storing a model lineage, of the selected model, identifying a version of the selected model, a training time of the selected model, training data the selected model was trained with, metadata of the selected model, algorithms of the selected model, parameters of the selected model, and validation accuracies of the selected model.

3. The method of claim 1, further comprising:
for each list entry in the model list, designating the champion model over the plurality of challenger models based on a metric corresponding to the respective data analysis project for the list entry.

4. The method of claim 1, further comprising:
presenting the list entry with a validation accuracy of the selected model.

5. The method of claim 1, further comprising:
presenting the plurality of challenger models with corresponding validation accuracies.

6. The method of claim 1, further comprising:
deploying the selected model using the deployment settings and a procedure call standard selected from among a plurality of procedure call standards.

7. The method of claim 1, further comprising:
deploying the selected model using continuous deployment and continuous delivery using an automated pipeline to train, test, deploy, and continuously improve the selected model in production.

8. The method of claim 1, further comprising:
monitoring deployment of the selected model with performance metrics, audit logs, and relevant performance indicators.

9. The method of claim 1, further comprising:
identifying degradation of the selected model over time using a model drift alert.

10. The method of claim 1, further comprising:
monitoring deployment of the selected model to auto-scale compute resources allocated to the selected model.

11. The method of claim 1, further comprising:
presenting the deployment status of the selected model with a link to the selected model.

12. The method of claim 1, wherein the deployment status comprises one of "pass", "fail", and "in progress".

13. The method of claim 1, wherein the retraining of the plurality of challenger models is performed periodically on a schedule of at least one day between each retraining.

14. The method of claim 1, wherein the champion model is automatically selected from among the plurality of challenger models based on one or more model accuracy metrics that identify an accuracy of each model, the one or more model accuracy metrics comprising one or more of: a mean absolute value (MAV), a mean absolute error (MAE), a root mean squared error (RMS), or a Pearson correlation coefficient (PCC).

15. The method of claim 1, wherein the deployment status is indicated by displaying, on a user interface, at least two of: an image, text, or a link.

16. The method of claim 15, wherein, responsive to the deployment status being "pass", the link is displayed on the user interface.

17. A system, comprising:
an inspection view;
a deployment view; and
a server application executing on one or more servers and configured for:
   presenting the inspection view with a model list, the model list comprising a plurality of list entries, each list entry corresponding to a respective data analysis project, each list entry comprising:
      a plurality of challenger models corresponding to the respective data analysis project for the list entry; and
      a selected model comprising a champion model for the respective data analysis project, the champion model being automatically selected from among the plurality of challenger models periodically after retraining of the plurality of challenger models is performed;

receiving a selection of a selected list entry from among the plurality of list entries in the model list;

receiving deployment settings of the selected model of the selected list entry;

presenting the deployment view with a deployment list with the selected model; and updating a deployment status of the selected model in the deployment view, wherein the retraining of the plurality of challenger models is performed periodically after a deployment of the selected model based on at least a performance metric monitored during the deployment.

18. The system of claim 17, wherein the server application is further configured for:

storing a model lineage, of the selected model, identifying a version of the selected model, a training time of the selected model, training data the selected model was trained with, metadata of the selected model, algorithms of the selected model, parameters of the selected model, and validation accuracies of the selected model.

19. The system of claim 17, wherein the server application is further configured for:

for each list entry in the model list, designating the champion model over the plurality of challenger models based on a metric corresponding to the respective data analysis project for the list entry.

20. The system of claim 17, wherein the server application is further configured for:

presenting the list entry with a validation accuracy of the selected model.

21. The system of claim 17, wherein the server application is further configured for:

presenting the plurality of challenger models with corresponding validation accuracies.

22. The system of claim 17, wherein the server application is further configured for:

deploying the selected model using the deployment settings and a procedure call standard selected from among a plurality of procedure call standards.

23. The system of claim 17, wherein the server application is further configured for:

deploying the selected model using continuous deployment and continuous delivery using an automated pipeline to train, test, deploy, and continuously improve the selected model in production.

24. A method, comprising:

displaying, on a user interface, an inspection view with a list of models, the list of models comprising a plurality of list entries, each list entry corresponding to a respective data analysis project, each list entry comprising:

a plurality of challenger models corresponding to the respective data analysis project for the list entry; and a selected model comprising a champion model for the respective data analysis project, the champion model being automatically selected from among the plurality of challenger models periodically after retraining of the plurality of challenger models is performed;

receiving a selection of a selected list entry from among the plurality of list entries in the list of models;

receiving deployment settings of the selected model of the selected list entry;

displaying, on a user interface, a deployment view with the list of models; and updating a deployment status of the selected model in the deployment view, wherein the retraining of the plurality of challenger models is performed periodically after a deployment of the selected model based on at least a performance metric monitored during the deployment.

\* \* \* \* \*